US000001240H

United States Statutory Invention Registration [19]

[11] Reg. Number: H1240

Tardiff, Jr. et al.

[43] Published: Oct. 5, 1993

[54] LOW PROFILE CHEMICAL BIOLOGICAL AIR FILTER

[75] Inventors: Albert N. Tardiff, Jr., Gaithersburg, Md.; Corey M. Grove, Red Lion, Pa.

[73] Assignee: The United States of America as represented by the Secretary of the Army, Washington, D.C.

[21] Appl. No.: 45,158

[22] Filed: Apr. 12, 1993

[51] Int. Cl.[5] ..... B01D 24/00; B01D 50/00

[52] U.S. Cl. ..... 55/323; 55/522

[58] Field of Search ..... 55/323, 522

*Primary Examiner*—David H. Brown

*Attorney, Agent, or Firm*—Anthony T. Lane; Edward Goldberg; Michael Sachs

[57] ABSTRACT

A low profile chemical biological air filter, comprising a frame having a first end for attachment to a mask and having an upwardly facing surface defining an inlet for the filter. The frame has a length sufficient to space first and second filters from the inlet to the attachment first end and a width sufficient to enclose the two filters. Its thickness is no greater than that necessary to contain only one of the two filters to minimize the thickness of the frame by placing the two filters side by side. The filters include a HEPA filter for removing particulate material from the air and a Whetlerized charcoal filter bed for secondary filtering of the air. The HEPA filter is supported in the frame at the inlet as is the charcoal filter bed along with a fines filter for protecting from dust which may be dislodged from the charcoal filter bed. The frame has a flexible hollow connector made from bromobutyl rubber or other applicable material for defining an air flow path sequentially from the inlet through the HEPA filter through the charcoal filter bed to the attachment first end. A sealant is provided to hold the HEPA filter in place. Also provided is a retainer for supporting the HEPA filter and charcoal filter bed constructed from plastic or aluminum and having a shape similar to one-sixteenth mesh screen.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LOW PROFILE CHEMICAL BIOLOGICAL AIR FILTER

The invention described herein may be made, used, or licensed by or for the Government for Governmental purposes without the payment to me of any royalties thereon or therefor.

FIELD OF THE INVENTION

The present invention relates to an improved filter for use in filtering chemical and biological contaminants in the air, and more particularly to a filter device in which the filter has an improved profile for use with respiratory protective masks.

BACKGROUND OF THE INVENTION

Protective masks which are worn for protection against chemical and biological gas or vapors have gained significant acceptance in recent years. These devices have been provided with filters which remove most of the objectionable or hazardous materials, enabling the user to function in otherwise difficult environments.

One major advance in protective masks of this type has been the use of canister filters which contain an effective amount of filtering material. These canisters are replaceable so that the mask itself remains with the individual who regularly uses it and allows that person to replace the filter when it has been overused or exhausted. One form of canister type protective mask device which has been in use is known as a high profile canister filter.

These filters are, as originally designed, difficult to use for several reasons. One drawback with these devices is the difficulty in changing the filter during extended use without exposing the user to unfiltered atmosphere. Some prior art designs are such that the mask must be removed in order to change the filter, making that operation possible without risk to the user only after completion of the activity during which exposure is possible. The time that the device can be used is therefore limited to the length of time that the filter can be safely used before it is saturated or clogged or otherwise in need of replacement.

Another major problem is that mounting the canister on the face of the mask produces an orientation which is prominent and even at time awkward. Sometimes during maneuvers, hard contact with the canister occurs which results in the face seal of the respiratory protective device being broken. That, of course, defeats the entire purpose of the mask and exposes the user to a high risk.

In prior art designs in which the canister is mounted on the face of the protective mask, users have often experienced tiring of the neck muscles because of the weight and awkward orientation of the canister on the mask. No current negative pressure respiratory protective devices display methods to alleviate this problem.

Accordingly, an object of this invention is to provide a filter which can easily be replaced without adversely exposing the user to a great risk of contact with the environment from which the user is being protected.

Another object of this invention is to provide a design for a filter for a protective mask which does not place an undue strain on the muscles of the user because of awkward orientation and weight of the canister on the mask.

Yet another object of this invention is to provide a filter device which is not at risk of being unnecessarily contacted during use.

Other objects will appear hereinafter.

SUMMARY OF THE INVENTION

It has now been discovered that the above and other objects of the present invention may be accomplished in the following manner. Specifically, a low profile chemical biological air filter device if provided in accordance with the present invention. The device is admirably suited for use where the aforementioned needs of low profile are desired.

The low profile chemical biological filter device includes a frame with a first end for attachment to a mask. It is contemplated that a conventional attachment mechanism will be used, so that the filter itself is all that must be provided to bring the present invention into the field and into use as quickly and efficiently as possible. The frame has an upwardly facing surface in which is included an inlet air into the filter device itself. The frame itself has sufficient length to space two filters in series extending from the inlet to the attachment first end. The frame also has a width sufficient to enclose the two filters. The frame is designed so that its thickness is no greater than that necessary to contain only one of the two filters to thereby minimize the thickness of the frame since the two filters are placed side by side along the length from the inlet to the attachment end.

The first filter includes a filter for removing particulate material from the air, and is generally known as a HEPA filter. HEPA is an acronym for High Efficiency Particulate Air filters which is known in the industry and which removes substantially all of the particulate matter from air or other gases which pass through the filter medium. Upon installation into the filter frame, the HEPA filter is held in place with a room temperature vulcanized silicone or other applicable material.

The second filter includes a charcoal filter bed for secondary filtering of the air. The preferred charcoal filter bed comprises a commercially known charcoal filter known as a Whetlerized charcoal filter material. These Whetlerized charcoal filter materials are typically found in chemical biological filter products and devices. Also provided in this filter is a fines filter means for protecting from dust which may be dislodged from the charcoal filter bed.

The frame includes a connector for defining an air flow path sequentially from the inlet in the frame through the HEPA filter, then through the charcoal filter bed and finally to the attachment first end and into the mask itself. Since the frame has a height defined by the thickness of the larger one of the filter means, the HEPA filter and the charcoal filter bed sequentially filter air entering the inlet as they are aligned side by side from inlet to attachment. In a preferred embodiment, the connector means is a flexible hollow connector tube made from bromobutyl rubber or other applicable material. Also preferred is to include a retainer for supporting the HEPA filter and charcoal filter bed. The retainer is constructed from plastic or aluminum and has a shape similar to one-sixteenth mesh screen.

BRIEF DESCRIPTION OF THE DRAWINGS

For a more complex understanding of the invention, reference is hereby made to the drawings, in which.

DETAILED DESCRIPTION OF THE PREFERRED EMBODIMENT

Figure 1:
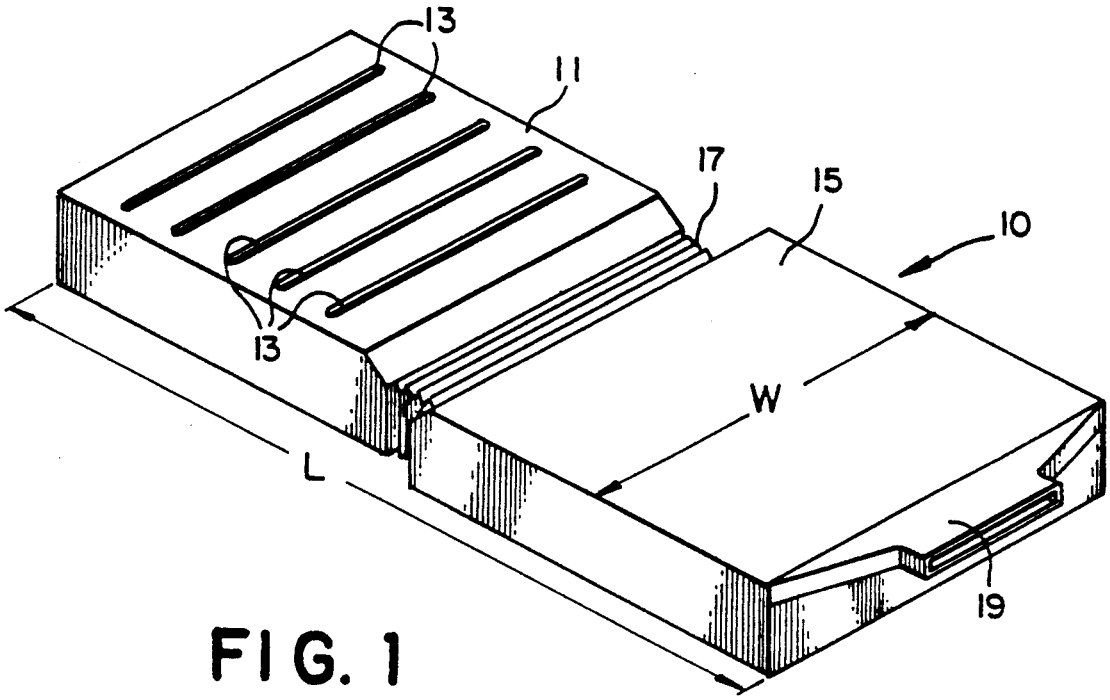
FIG. 1 is an enlarged schematic view, shown in perspective, of a device according to the present invention.

As shown in the Figures, a low profile chemical biological air filter device 10 generally includes a frame 11 with an upwardly facing surface having inlets 13 on the front end of frame 11. Frame 11 also includes a frame back portion 15 which is connected to a connector 17 and includes an end 19 for attachment to a mask. Connector 17 is a flexible hollow connector made from bromobutyl rubber or other similar material.

Frame 11 has a length L which is sufficient to space a first and a second filter from said inlets 13 to the attachment end 19. Frame 11 has a width W which is sufficient to enclose the two filters. The first and second filter means including a HEPA filter 21 for removing particulate material from the air and a charcoal filter bed 23 for secondary filtering of air passing through the device. Both the HEPA filter 21 and the charcoal filter bed 23 are supported in frame 11 by a retainer 27. This retainer 27 supports the HEPA filter 21 and charcoal filter bed 23 and may be constructed from plastic or aluminum, having a shape similar to one-sixteenth mesh screen.

Figure 2:
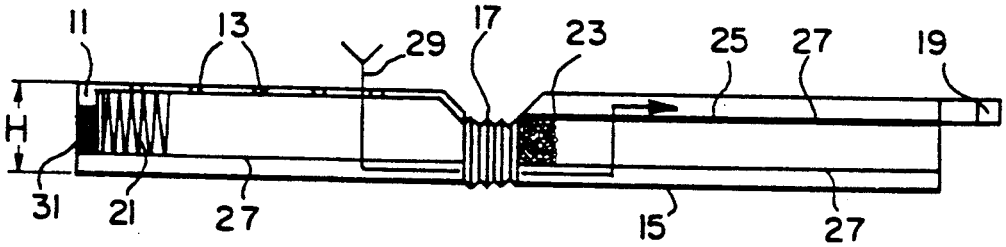
FIG. 2 is a side elevational view, shown partially in section, showing the internal construction of the device of FIG. 1.

The frame has a height or thickness H which is no greater than that necessary to contain only one of the two filters to thereby minimize the thickness of the frame by placing the two filters side by side as shown if FIG. 2. In fact, height or thickness H accommodates HEPA filter 21 and charcoal bed 23, both of which are held in place by retainer 27. Fines filter 25 protects the user and positions the charcoal bed 23 near the attachment end 19. HEPA filter 21 is sealed by a room temperature vulcanized silicone sealant 31 or other applicable material which holds HEPA filter 21 in place.

As can be seen in FIG. 2, connector 17 defines an air flow path shown by arrow 29 from the inlets 13 through the HEPA filter 21, then through the charcoal filter bed 23 and fines filter 25 to the attachment end 19. Fines filter 25 protects the user from dust which may be dislodged from the charcoal filter bed 23.

Low profile chemical biological air filter devices of the type shown above overcome those difficulties described above and have been found to be very effective in use. Specifically, the present invention may permit changing the filter during extended use without exposing the user to unfiltered atmosphere. The mask need not be removed in order to change the filter, making that operation possible without excessive risk. The time that the device can be used is not limited to the length of time that the filter can be safely used before it is saturated or clogged or otherwise in need of replacement. The device of this invention is able to provide a filter which can easily be replaced without adversely exposing the user to a great risk of contact with the environment from which the user is being protected. This is facilitated by the user being able to have eye contact with the filter during replacement while still wearing the mask.

Another major advantage of the present invention is that mounting the canister on the face of the mask as shown herein does not produce any prominent or awkward orientation. As contrasted with prior art designs in which the canister is mounted on the face of the protective mask, users of the present invention do not experience tiring of the neck muscles because there is not any significant weight and awkward orientation of the canister on the mask.

While particular embodiments of the present invention have been illustrated and described herein, it is not intended that these illustrations and descriptions limit the invention. Changes and modifications may be made herein without departing from the scope and spirit of the following claims.

We claim:

1. A low profile chemical biological air filter device, comprising:

a frame having a first end for attachment to a mask and having an upwardly facing surface defining an inlet for said filter, said frame having a length sufficient to space first and second filter means from said inlet to said attachment first end and a width sufficient to enclose said two filter means, said frame having a thickness no greater than that necessary to contain only one of said two filter means to thereby minimize the thickness of said frame by placing said two filter means side by side;

said first and second filter means including a HEPA filter for removing particulate material from the air and a charcoal filter bed for secondary filtering of said air, said HEPA filter being supported in said frame at said inlet, said frame having connector means for defining an air flow path from said inlet through said HEPA filter through said charcoal filter bed to said attachment first end, said frame further having a height defined by the thickness of only one of said filter means, wherein said HEPA filter and said charcoal filter bed sequentially filter air entering said inlet.

2. The device of claim 1, which further includes a sealant to hold said HEPA filter in place.

3. The device of claim 1, wherein said connector means is a flexible hollow connector made from bromobutyl rubber or other applicable material.

4. The device of claim 1, which further includes retainer means for supporting said HEPA filter and charcoal filter bed constructed from plastic or aluminum and having a shape similar to one-sixteenth mesh screen.

5. The device of claim 1, wherein said charcoal filter bed comprises a Whetlerized charcoal filter material.

6. The device of claim 5, which further includes a fines filter means for protecting from dust which may be dislodged from said charcoal filter bed.

7. A low profile chemical biological air filter, comprising:

a frame having a first end for attachment to a mask and having an upwardly facing surface defining an inlet for said filter, said frame having a length sufficient to space first and second filter means from said inlet to said attachment first end and a width sufficient to enclose said two filter means, said frame having a thickness no greater than that necessary to contain only one of said two filter means to thereby minimize the thickness of said frame by placing said two filter means side by side;

said first and second filter means including a HEPA filter for removing particulate material from the air and a Whetlerized charcoal filter bed for secondary filtering of said air, said HEPA filter being supported in said frame at said inlet and said charcoal filter bed including a fines filter means for protecting from dust which may be dislodged from said charcoal filter bed;

said frame having connector means including flexible hollow connector made from bromobutyl rubber or other applicable material for defining an air flow path from said inlet through said HEPA filter through said charcoal filter bed to said attachment first end, said frame further having a height defined by the thickness of only one of said filter means, wherein said HEPA filter and said charcoal filter bed sequentially filter air entering said inlet.

8. The of device of 7, which further includes a sealant to hold said HEPA filter in place.

9. The of device of 7, which further includes retainer means for supporting said HEPA filter and charcoal filter bed constructed from plastic or aluminum and having a shape similar to one-sixteenth mesh screen.

* * * * *